United States Patent Office 3,344,695
Patented Oct. 3, 1967

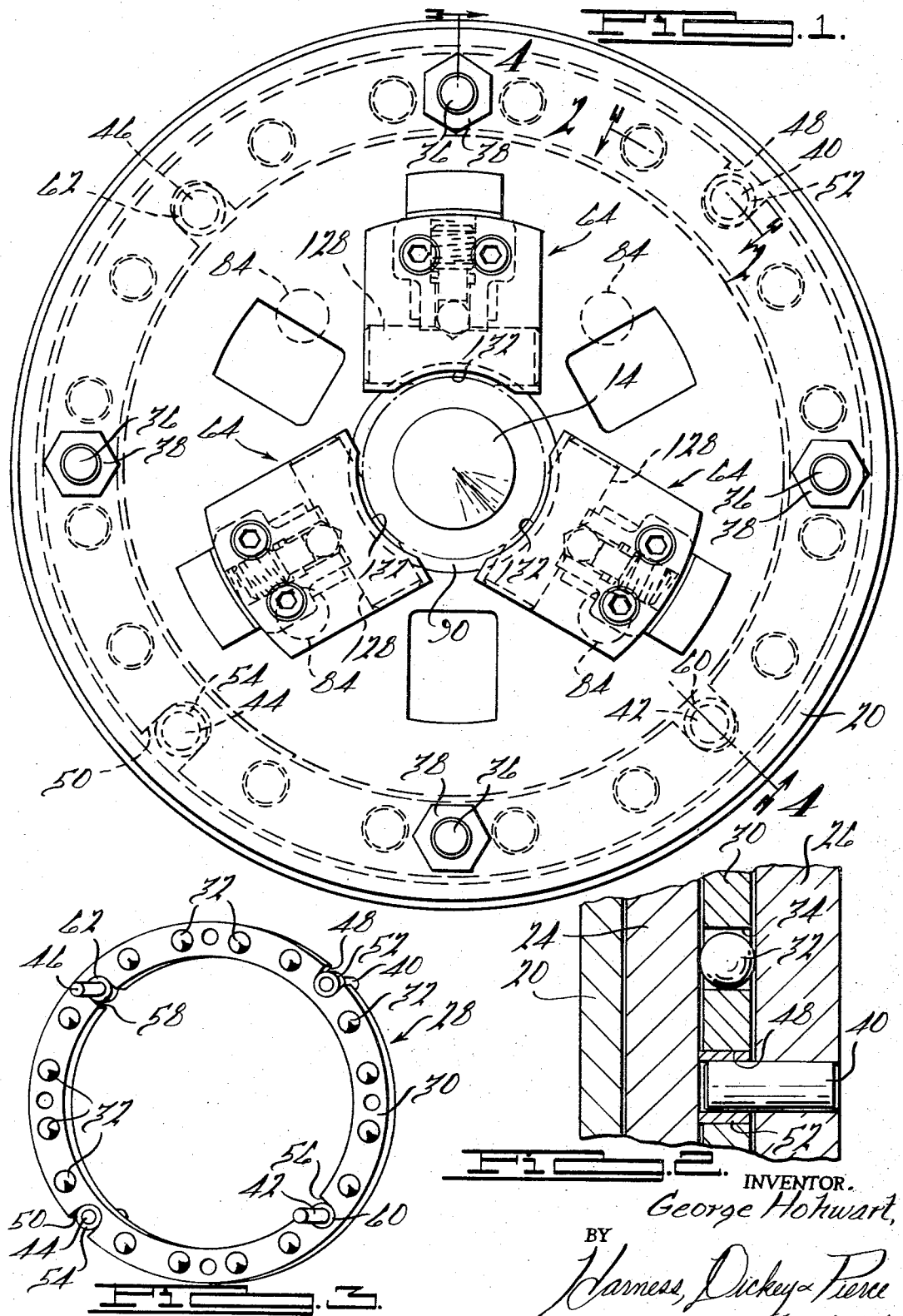

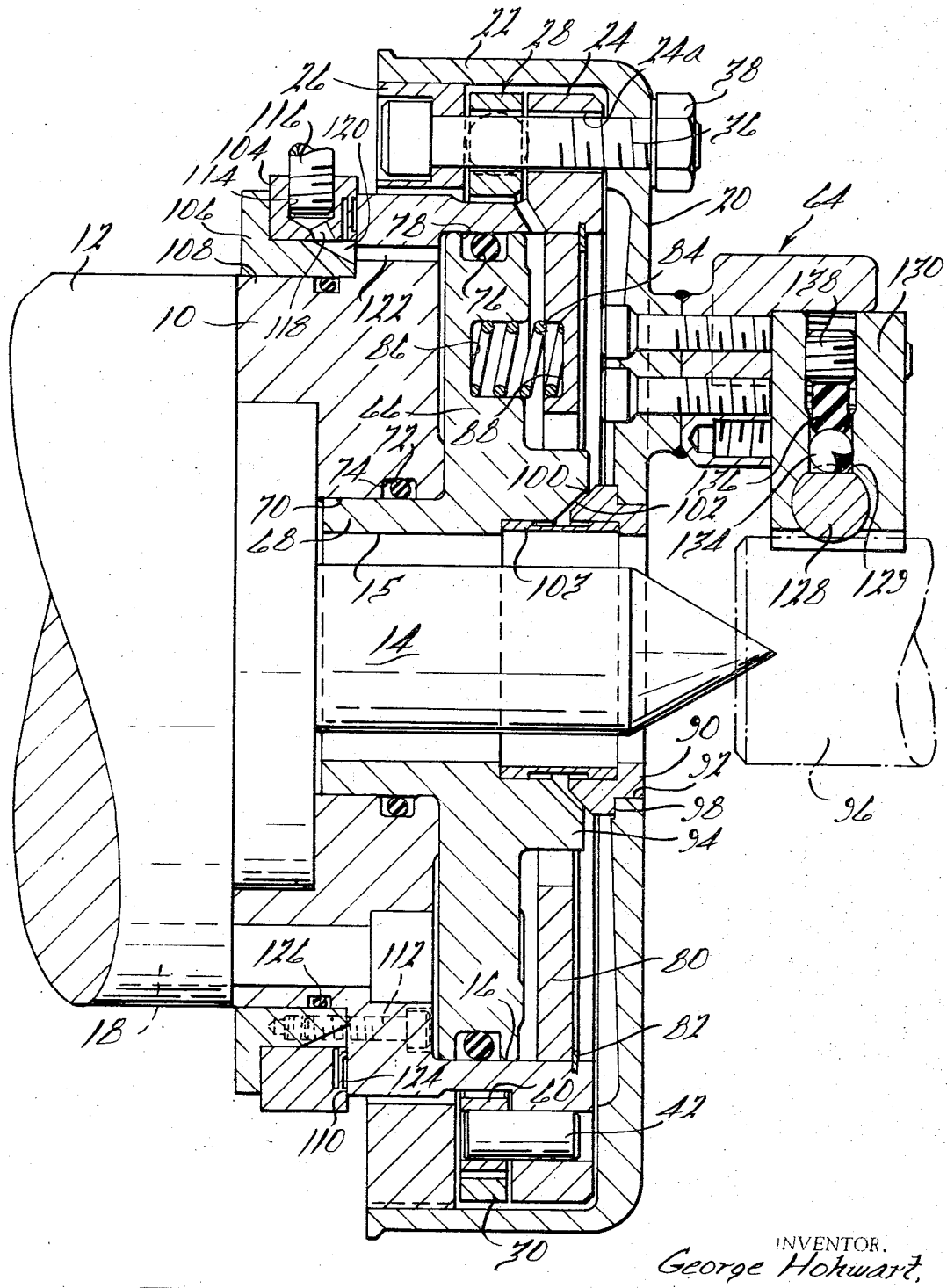

3,344,695
FLOATING WORK DRIVER CHUCK
George Hohwart, Farmington, Mich., assignor to N. A. Woodworth Company, Ferndale, Mich., a corporation of Michigan
Filed Aug. 1, 1966, Ser. No. 569,334
8 Claims. (Cl. 82—40)

This invention relates to new and useful improvements in work holding industrial chucks. More particularly it relates to a chuck of this type having a free floating action which permits it to clamp and rotatably drive an already postitioned and held part or workpiece and at the same time accommodate variations in the shape of different workpiece due to warping or other causes without bending or stressing the work as a result of the clamping action.

There is a need for a chuck that will hold and rotatably drive a workpiece without bending or distorting it while it is supported or held in some manner as between centers or in V-blocks. For example, a chuck mounted on the headstock of a lathe, grinder or the like must clampingly engage a workpiece which is supported on live and dead centers and it must hold and rotatably drive the work during a machining or grinding operation. The trouble in this kind of situation is that the peripheral surface engaged by the chuck jaws may not be exactly concentric to the centers or the workpiece may not be straight but rather warped or bent. Further, the chuck may be required to chuck a number of different workpieces embodying either or all of these conditions in varying degrees. It is of course necessary that the chuck hold the workpiece sufficiently tight to rotatably drive it during the grinding, machining or other operation, but it is desirable also that it do so without bending or stressing the work on the centers. The chuck of this invention has a free floating action which causes the face portion of the chuck to shift or compensate for variations in the workpieces so that the jaws do not stress or tend to distort the work from its "as is" condition. In other words, if the workpiece is bent or warped slightly, the chuck will adapt itself to the shape and condition of the part and will not try to bend or straighten it on the centers.

From the foregoing, it will be readily apparent that an important object of the present invention is to provide a chuck that is free floating so as to grip and drive a part without influencing its previous location either on centers or on V-block supports.

Another object of the invention is to provide a chuck of the above mentioned character having jaws that grip the work tightly but which utilizes the built-in free floating action in such a way that the jaws do not distort the part from its "as is" condition.

Still another object of the invention is to provide a chuck of the above mentioned character that centers the face portion of the chuck automatically after each clamping operation to precondition it for the next workpiece and to prevent possisble interference while loading.

Other objects and advantages of the invention will be apparent during the course of the following description.

In the drawings, forming a part of this specification and wherein like numerals are employed to designate like parts throughout the same, FIGURE 1 is a face plan view of a chuck embodying the instant invention, FIGURE 2 is an enlarged, fragmentary sectional view taken on the line 2—2 of FIGURE 1.

FIGURE 3 is a perspective view of a portion of the chuck responsible for the free floating, compensating action, and FIGURE 4 is an enlarged, longitudinal sectional view taken on the line 4—4 of FIGURE 1.

In the drawing, wherein for the purpose of illustration is shown a preferred embodiment of the invention, the numeral 10 designates a generally disk shaped mounting plate here shown on the end of a machine tool spindle 12. The latter may be the spindle in the head stock of a grinder for example, and is here shown equipped with a live center 14 which extends through a central opening 15 in the chuck. The front face of the mounting plate 10 is recessed to define a cylinder 16 and machine screws 18 extending rearwardly into the spindle 12 from the bottom of the cylinder fasten the mounting plate securely to the spindle.

The face portion of the chuck is here shown in the form of a cup-shaped diaphragm 20 and the latter is mounted on the plate 10 with the annular skirt portion 22 of the diaphragm disposed around and extending rearwardly of a radially outwardly extending annular flange 24 on the plate. A ring 26 is press fitted or otherwise fixed in the skirt portion 22 and in overlapping relation with the flange 24, and interposed between the flange 24 and the ring 26 is a ball race 28 which, in the particular form of the invention shown consists simply of an annular ring 30 containing a plurality (here shown as sixteen) spherical bearings or balls 32. As shown in FIGURE 2, the balls 32 fit closely in holes 34 provided in the race ring 30, and the diameter of the balls 32 is slightly greater than the thickness of the ring so that the balls hold the ring spaced slightly from the flange 24 and from the diaphragm ring 26. Screws 36 extending through the diaphragm 20, flange 24, ball race 28, and diaphragm ring 26, hold all of these parts assembled together. In practice, nuts 38 on the ends of the screws 36 are tightened sufficiently to take up any clearance or looseness between the interconnected parts but not sufficiently to prevent relative movement therebetween.

A rotary driving connection between the mounting plate 10 and the diaphragm 20 is established by four drive pins 40, 42, 44 and 46 which are spaced equidistantly around the chuck. Two of the pins 40 and 44, in diametrically opposed relation on opposite sides of the chuck, are pressed into suitable holes provided in the diaphragm ring 26 so that they are fixed to and in effect are part of the diaphragm face portion of the chuck. These pins 40 and 44 extend forwardly from the diaphragm ring 26 into slots 48 and 50 which open through the outer periphery of the race ring 30 and rollers 52 and 54 on the projecting ends of the pins fit snugly in the slots as shown in FIGURES 1-3. The other two pins 42 and 46, also in diametrically opposed relation on opposite sides of the chuck and in right angular relation with respect to the pins 40 and 44, are pressed into suitable holes provided in the mounting plate flange 24 so that they are fixed to and in effect are part of the mounting portion of the chuck. These pins 42 and 44 extend rearwardly from the flange 24 and into slots 56 and 58 which open through the inner periphery of the race ring 30, and, the projecting ends of the pins 42 and 46 are similarly provided with rollers 60 and 62 which fit snugly within their respective slots. Thus, rotary driving force from the spindle 12 to the diaphragm 20 is established through the mounting plate 10, the drive pins 42 and 46 and the rollers 60 and 62 thereon, the ball race 28, the drive pins 40 and 44, and the rollers 52 and 54 thereon, the diaphragm ring 26, and the bolts 36 which connect the diaphragm ring to the diaphragm.

A plurality of jaw assemblies 64 are mounted on the radial face portion of the diaphragm 20. Three such jaw assemblies are here shown spaced equidistantly from the center of the chuck and equispaced angularly with respect to each other. Because of the connecting bolts 36 and other connecting parts hereinabove described, the diaphragm or face portion of the chuck rotates in unison with the spindle 12. However, because of the ball race 28, the diaphragm assembly of the chuck is free to move radially on the mounting portion thereof within limits established by clearances between the bolts 36 and the holes 24a in the flange 24, and the clearance in each instance, of course, is sufficient to meet the adjustment requirements of the particular chuck. The fact that the slots 48 and 50 open outwardly through the race ring 30 while the slots 56 and 58 open inwardly therethrough permits the radial shifting movement of the diaphragm assembly to be universal in nature. In normal practice, the floating movement of the diaphragm assembly should be at least about .060 inch, but if necessary it may of course be more or less than this amount.

In order to provide for power actuation of the chuck, a piston 66 is mounted in the cylinder 16. The particular piston 66 here shown by way of illustration has a hub portion 68 which fits snugly but slidably in a central opening 70 provided in the mounting plate 10 and the main body of the piston fits relatively snugly but slidably in the cylinder 16. An O-ring 72 disposed in an annular groove 74 in the opening 70 seals the hub 68, and an O-ring 76 disposed in a groove 78 in the periphery of the piston 66 seals the latter to the annular wall of the cylinder 16. A flat annular plate 80 in the cylinder 16 ahead of the piston 66 is retained by a snap ring 82, and compression springs 84 confined between the piston and the plate 80 hold the piston normally retracted in the cylinder. Four of the springs 84 spaced equidistantly around the piston 66 are here shown (FIGURE 1). In each instance, the end portions of the spring 84 are set into opposed recesses 86 and 88 provided in the piston 66 and in the plate 80, respectively, as shown in FIGURE 4.

A pusher ring 90 fitted in a central opening 92 in the diaphragm 20 is engaged by a central embossment 94 on and extending forwardly of the piston 66. When the piston 66 is advanced in the cylinder 16 against the action of the compression springs 84, it flexes the central portion of the diaphragm 20 outwardly and releases the jaw assemblies 64 from a workpiece 96 engaged thereby. Conversely, when pressure behind the piston is relieved, the compression springs 84 retract the piston 66 in the cylinder 16 so that the inherent resilient action of the diaphragm 20 can return the central portion thereof to its normal position and close the jaw assemblies 64 on the workpiece 96. In order to transmit forward thrust from the piston 66 to the diaphragm 20, the pusher ring 90 is formed with a radial shoulder 98 which fits behind the diaphragm around the opening 92. It is a special feature of the invention that the pusher ring 90 and the embossment 94 are provided with complementary bevelled surfaces 100 and 102 which interengage when the piston 66 is advanced to open the jaw assemblies 64; and, by reason of such engagement, center the diaphragm assembly automatically on the base or mounting portion of the chuck. This is desirable to prevent possible interference between the jaw assemblies 64 and the work particularly during automatic loading and unloading of the latter. Also, it assures centralizing of the diaphragm 20 and the jaw assemblies 64 about the rotational axis of the chuck each time a workpiece is removed from the chuck preparatory to the next workpiece being loaded into the chuck. An elastic cylindrical seal 103 extending between and suitably fastened to the piston 66 and to the pusher ring 90 seals the mechanism inside the chuck while permitting the chuck to float or compensate.

It is contemplated that the piston 66 be advanced in the cylinder 16 by fluid pressure; and, in the form of the invention here shown, air under pressure is introduced into the cylinder 16 by a slip ring 104 held on the rear face of the mounting plate 10 by a retaining ring 106. As shown, the retaining ring 106 fits snugly around a rear hub portion 108 of the mounting plate 10, and the slip ring 104 is held in pressed engagement with the rear radial face 110 of the mounting plate by the retaining ring Screws 112 extending rearwardly from the bottom of the cylinder 16 and into the retaining ring 106 hold the latter attached securely to the mounting plate 10. A slip ring of the type shown in the Hohwart et al. Patent No. 2,577,656 or the one shown in the Hohwart Patent No. 2,993,473 may be used. The former is shown here for the purpose of illustration. In any event, the slip ring 104 normally is stationary while the retaining ring 106 rotates with the chuck and the spindle 12. Air under pressure from any suitable source is carried to an entrance port 114 in the slip ring 104 by a pipe 116; and, from the port 114, the air passes through an opening 118 to an annular chamber 120 in the retaining ring 106 at one side of the slip ring and thence through axial passages 122 in the mounting plate 10 to the bottom of the cylinder 16. A flexible sealing flange 124 on and at the forward side of the slip ring 104 and seals the latter against the confronting radial face 110 of the mounting plate 10, and an O-ring 126 seals the joint between the retaining ring 106 and the hub 108 of the mounting plate. It is contemplated, of course, that the air pressure in the cylinder 16 behind the piston 66 exert sufficient force to overcome the combined resistance of the compression springs 84 and the diaphragm 20 so that the jaw assemblies 64 are held open so long as air pressure is maintained in the cylinder. In practice, the air pressure is kept on during unloading of the workpiece and until a new workpiece is inserted into the chuck. The air pressure in the supply pipe 116 is then shut off and the cylinder behind the piston is opened to atmosphere in the conventional manner so that the combined action of the diaphragm 20 and the compression springs 84 retracts the piston 66 in the cylinder 16 and closes the jaw assemblies 64 on the workpiece 96.

As previously suggested, the chuck of this invention is adapted to be mounted on a grinder, for example, in which a workpiece 96, such as a crank shaft or the like, is confined in the conventional way between the live center 14 on the spindle 12 and a dead center (not shown). As shown in FIGURE 4, the live center 14 extends through the chuck and seats in a suitable conical recess provided in one end of the work 96 and the chuck is adapted to grip the end portion of the workpiece which extends from the center 14 so as to rotatably drive the work in unison with the spindle.

It is a feature of this invention that each of the work holding jaws 64 is equipped with a rocker pin 128 which extends transversely of the jaw body 130 and tangentially with respect to the workpiece 96. The rocker pin 128 has an arcuate work engaging surface 132 (FIG. 1) which seats on the work 96 and establishes the actual gripping contact between the jaw and the workpiece. In each instance, the rocker pin 128 is free to turn within limits on its axis but is held normally in a centered position by a ball 134 which seats in a V-groove or drill spot 129 in the back of the pin. A spring or rubber pad 136 behind and bearing on the ball keeps it in place while permitting it to rotate to conform to the workpiece, and an adjustable back-up screws 138 behind and bearing on the spring pad 136 keeps the entire assembly properly tensioned.

Prior to the time the workpiece 96 is finish ground for example, its periphery may be slightly eccentric to the chuck as the result of a previous rough grinding or turning operation and/or the axis of the workpiece may be at a slight angle with respect to the axis of rotation of the chuck due to distortion in the work as the result of a previous heat treating operation or the like. The chuck here shown is designed and adapted to grip the workpiece 96 under these conditions with equal pressure at each jaw and without stressing or distorting the workpiece. In other words, if the workpiece 96 is "bent" slightly from the rotational axis of the chuck, the latter will not attempt to straighten the workpiece when it grips the work. As a result, the workpiece 96 can be finish ground to an exact dimension and there is no spring back or other undesirable effect when the workpiece is released and removed from the chuck. Manifestly, the thing that permits the chuck of this invention to function in the manner described is the free floating mounting of the face or diaphragm portion thereof on the rear or mounting portion and, to an extent, the combined effects resulting from the floating mounting of the diaphragm assembly and the oscillatable pin-type grippers 128 of the jaw assemblies 64.

In practice, the workpiece 96 is inserted in the chuck and clamped between the live and dead centers of the machine while the chuck is open. When the chuck is closed, the jaw assemblies 64 come in to grip the work and, if the periphery of the work is eccentric to the axis of the chuck within the limits of radial adjustment provided for by the diaphragm assembly, the latter will shift radially on the chuck body to compensate for the eccentricity and all of the jaws 64 will grip the workpiece with equal pressure. Manifestly, any "bending" of the workpiece 96 with respect to the rotational axis of the chuck is compensated by the pins 128 which turn on their axes as required to bring the work engaging and clamping surfaces 132 into flat engagement with the workpiece.

Having thus described the invention, I claim:

1. A free floating rotatable chuck for clamping the driving a previously positioned and held workpiece comprising a mounting portion,
   a mounting portion,
   a face portion,
   means interconnecting said mounting portion and said face portion establishing a rotary driving connection therebetween while permitting said face portion to move freely radially within limits on and relative to said mounting portion,
   jaws on said face portion having
      adjustable working engaging elements thereon,
   actuator means for opening and closing said jaws to move said work engaging element into and out of engagement with a workpiece in the chuck, the face portion of said chuck being adapted to shift radially on the mounting portion thereof and said work engaging elements being adapted to adjust simultaneously in said jaws to accommodate the chuck to the workpiece without bending or distorting the latter when clampingly engaged by said jaws.

2. The combination as set forth in claim 1
   wherein said work engaging elements are disposed for direct engagement with a workpiece in the chuck, and
   wherein said work engaging elements are provided with work engaging surfaces and are rotatably adjustable in and relative to the jaws to accommodate said surfaces to variations in the angular position of the workpiece relative to the axis of the chuck.

3. The combination as set forth in claim 1
   wherein said work engaging elements are in the form of rocker pins extending transversely of the jaws, and
   wherein said rocker pins are rotatably adjustable about the longitudinal axes thereof to adjust exposed work engaging surfaces thereon to variations in the angular position of the workpiece in said chuck, and
   including means coactive with said rocker pins for holding the work engaging surfaces thereof normally centralized in the jaws.

4. The combination as set forth in claim 1
   wherein said work engaging elements are in the form of rocker pins extending transversely of the jaws and having exposed work engaging surfaces thereon, and including
   spring loaded means in said jaws behind and engaging said rocker pins for holding the latter normally centralized in said jaws.

5. The combination as set forth in claim 1
   wherein said work engaging elements are in the form of rocker pins journaled in and extending transversely of the jaws and having exposed work engaging surfaces intermediate the ends thereof, and including tapered seats on the rocker pins behind said work engaging surfaces and spring loaded spherical pressure elements bearing on said tapered seats to hold said rocker pins normally centered in the jaws.

6. The combination as set forth in claim 1
   wherein said work engaging elements are in the form of rocker pins extending transversely of and journaled for rotation in said jaws, and
   wherein said rocker pins have exposed work engaging surfaces intermediate the ends thereof, and including
      formed seats on said rocker pins behind said work engaging surfaces,
      spherical pressure elements bearing on said seats,
      resilient means behind and seating against such spherical pressure elements, and
      adjustable backup screws engaging said resilient means and holding the same compressed sufficiently to maintain said rocker pins normally centered in said jaws.

7. The combination set forth in claim 1
   wherein the face portion of said chuck has a flexible diaphragm which carries said jaws and which is adapted to be flexed to open and close the jaws, and including
      a power actuator engageable with said diaphragm to flex the same between said closed and open position, and
      means cooperating with said power actuator and said diaphragm to center the latter on said mounting portion automatically when the jaws are opened.

8. The combination as set forth in claim 7
   wherein the last mentioned means is in the form of a pusher ring on the diaphragm, and
      a tapered annular surface on said power actuator engageable with said pusher ring to center the face portion of the chuck on said mounting portion when said actuator is operated to flex said diaphragm and to open said jaws.

References Cited
UNITED STATES PATENTS

| | | | |
|---|---|---|---|
| 1,446,060 | 2/1923 | Pratt | 82—40 |
| 3,087,737 | 4/1963 | Werth | 279—4 |

LEONIDAS VLACHOS, *Primary Examiner.*